United States Patent
Maki et al.

(10) Patent No.: US 9,963,520 B2
(45) Date of Patent: May 8, 2018

(54) AQUEOUS EMULSION AND ADHESIVE IN WHICH SAME IS USED

(71) Applicants: KURARAY CO., LTD., Kurashiki-shi (JP); KURARAY ASIA PACIFIC PTE. LTD., Singapore (SG)

(72) Inventors: Hideki Maki, Kurashiki (JP); Masato Nakamae, Singapore (SG)

(73) Assignees: KURARAY CO., LTD., Kurashiki-shi (JP); KURARAY ASIA PACIFIC PTE. LTD., Singapore (SG)

( * ) Notice: Subject to any disclaimer, the term of this patent is extended or adjusted under 35 U.S.C. 154(b) by 0 days. days.

(21) Appl. No.: 15/537,996

(22) PCT Filed: Dec. 24, 2015

(86) PCT No.: PCT/JP2015/006450
§ 371 (c)(1),
(2) Date: Jun. 20, 2017

(87) PCT Pub. No.: WO2016/103712
PCT Pub. Date: Jun. 30, 2016

(65) Prior Publication Data
US 2017/0369601 A1    Dec. 28, 2017

(30) Foreign Application Priority Data
Dec. 26, 2014    (JP) .................................. 2014-265809

(51) Int. Cl.
| | | |
|---|---|---|
| *C08F 2/20* | (2006.01) | |
| *C08F 2/24* | (2006.01) | |
| *C09J 109/00* | (2006.01) | |
| *C08L 29/04* | (2006.01) | |
| *C09J 133/04* | (2006.01) | |
| *C08L 101/02* | (2006.01) | |
| *C09J 11/08* | (2006.01) | |

(Continued)

(52) U.S. Cl.
CPC .................. *C08F 2/20* (2013.01); *C08F 2/24* (2013.01); *C08L 29/04* (2013.01); *C08L 101/02* (2013.01);
(Continued)

(58) Field of Classification Search
CPC ... C08F 2/20; C08F 2/24; C09J 175/04; C09J 157/00; C09J 133/04; C09J 131/02;
(Continued)

(56) References Cited

U.S. PATENT DOCUMENTS

2012/0329950 A1    12/2012    Kozuka

FOREIGN PATENT DOCUMENTS

| EP | 3 153 531 A1 | 4/2017 |
|---|---|---|
| JP | 5-279648 | * 10/1993 |

(Continued)

OTHER PUBLICATIONS

International Search Report dated Mar. 29, 2016 in PCT/JP2015/006450 filed Dec. 24, 2015.

*Primary Examiner* — Robert Harlan
(74) *Attorney, Agent, or Firm* — Oblon, McClelland, Maier & Neustadt, L.L.P.

(57) ABSTRACT

The present invention relates to an aqueous emulsion including an ethylenically unsaturated monomer unit-containing polymer as a dispersoid and a polyvinyl alcohol as a dispersant. The content of a free polyvinyl alcohol in the aqueous emulsion is 0.2 to 20 parts by mass relative to 100 parts by mass of the ethylenically unsaturated monomer unit-containing polymer. The free polyvinyl alcohol has a degree of saponification of 80.0 to 99.5 mol % and a viscosity-average degree of polymerization of 200 to 5000, and the free polyvinyl alcohol has a symmetry factor ($W_{0.05h}/2f$) that satisfies the following expression (1) as determined by gradient high-performance liquid chromatography for reversed-phase separation using a water-acetone eluent according to JIS K 0124 (2011).

$$0.85 \leq W_{0.05h}/2f \leq 1.30 \quad (1)$$

(The definitions of the symbols are omitted.)

6 Claims, 1 Drawing Sheet

(51) Int. Cl.
  *C09J 125/04* (2006.01)
  *C09J 131/02* (2006.01)
  *C09J 157/00* (2006.01)
  *C09J 175/04* (2006.01)

(52) U.S. Cl.
  CPC ............. *C09J 11/08* (2013.01); *C09J 109/00* (2013.01); *C09J 125/04* (2013.01); *C09J 131/02* (2013.01); *C09J 133/04* (2013.01); *C09J 157/00* (2013.01); *C09J 175/04* (2013.01)

(58) Field of Classification Search
  CPC ........ C09J 11/08; C09J 125/04; C08L 101/02; C08L 29/04
  See application file for complete search history.

(56) References Cited

FOREIGN PATENT DOCUMENTS

| | | | |
|---|---|---|---|
| JP | 5-279648 A | | 10/1993 |
| JP | 8-259659 | * | 10/1996 |
| JP | 8-259659 A | | 10/1996 |
| JP | 2002-256161 | * | 9/2002 |
| JP | 2005-082665 | * | 3/2005 |
| JP | 2007-23148 A | | 2/2007 |
| JP | 2009-084505 A | * | 4/2009 |
| JP | 2009-84505 A | | 4/2009 |
| WO | 2011/114575 A1 | | 9/2011 |
| WO | 2015/186745 A1 | | 12/2015 |
| WO | 2016/009631 A1 | | 1/2016 |

* cited by examiner

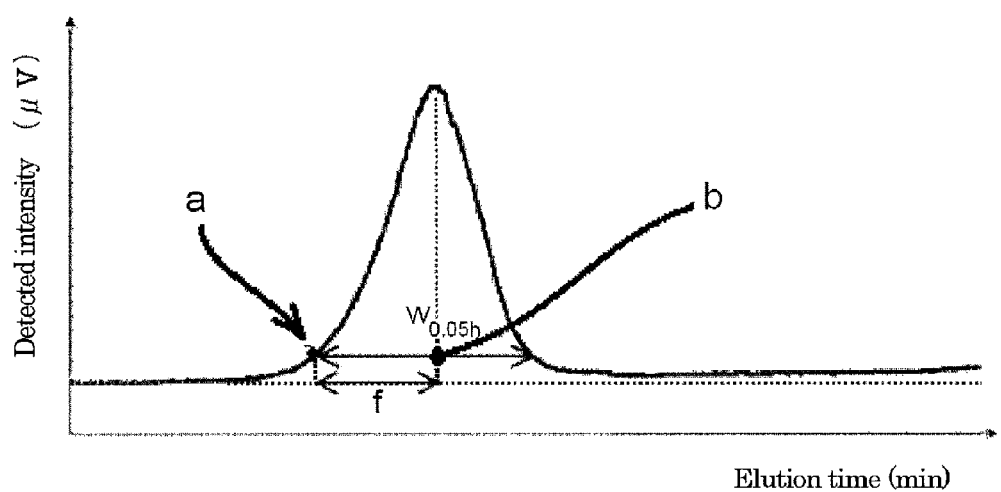

AQUEOUS EMULSION AND ADHESIVE IN WHICH SAME IS USED

TECHNICAL FIELD

The present invention relates to: an aqueous emulsion containing a specific amount of free polyvinyl alcohol having a specific symmetry factor on a chromatogram obtained by high-performance liquid chromatography (which may hereinafter be abbreviated as "HPLC"); and an adhesive containing the aqueous emulsion.

BACKGROUND ART

Aqueous polymer emulsions have hitherto been widely used in many applications such as adhesives for wood, paper, and plastics, paints, fiber processing agents, and paper processing agents. In particular, polyvinyl alcohol (which may hereinafter be abbreviated as "PVA") is known to act as a protective colloid in emulsion polymerization of vinyl ester monomers typified by vinyl acetate. Aqueous vinyl ester emulsions resulting from emulsion polymerization employing a PVA as an emulsion polymerization dispersant are widely used in applications such as various adhesives for paper, woodworking, and plastics, various binders for impregnated paper and non-woven textiles, admixtures, placing joint materials, paints, paper processing, and fiber processing.

When a PVA is used as a dispersant for emulsion polymerization as described above, it is necessary to prevent coagulation of the emulsion during emulsion polymerization and allow good polymerization stability to be achieved. PVAs are water-soluble, and this may cause disadvantages such as a reduction in water resistance of a coating formed from an emulsion obtained using a PVA and a reduction in mechanical stability of the obtained emulsion. The properties such as the water resistance and mechanical stability are known to significantly depend on the PVA used in emulsion polymerization.

Under these circumstances, attempts such as crystallinity control of PVAs or functional group introduction into PVAs have been made to improve specific properties of PVAs, and accordingly various modified PVAs have been developed. There has been proposed an adhesive containing an aqueous emulsion and a polyfunctional isocyanate compound, the aqueous emulsion being obtained by emulsion polymerization of an ethylenically unsaturated monomer and/or a diene monomer using an ethylene-modified PVA as an emulsion polymerization dispersant. This adhesive has been reported to have high storage stability, bond strength, and water resistance (Patent Literature 1). As an emulsion obtained using a modified PVA there has been proposed an aqueous emulsion obtained using as an emulsion polymerization dispersant a modified PVA containing a specific amount of unsaturated monomer units having a silyl group and using as a dispersoid a polymer of one or more monomers selected from ethylenically unsaturated monomers. This aqueous emulsion has been reported to have high water resistance and viscosity stability (Patent Literature 2).

As stated above, emulsions are required to have good mechanical stability and be capable of forming a coating with good water resistance. Adhesives that can be applied at a high speed are also increasingly demanded in industrial production. When a conventional adhesive is applied at a high speed exceeding 500 m/min, there occurs an undesired phenomenon such as scattering of the adhesive which is so-called "splashing". In addition, adhesives may be exposed to a harsh environment such as a hot or humid environment depending on the type of products in which the adhesives are used. Some conventional adhesives may, in such cases, experience a decrease in bond strength leading to separation, which means that they are unsatisfactory in terms of bond durability.

Under such circumstances, adhesives are required to be free from splashing during high-speed application, have high initial bond strength, and exhibit high bond durability at high temperature and high humidity.

However, the conventional emulsions and adhesives described above fail to meet all of the requirements, and an emulsion and an adhesive that meet these requirements are demanded.

CITATION LIST

Patent Literature

Patent Literature 1: JP 8-259659 A
Patent Literature 2: JP 2007-23148 A

SUMMARY OF INVENTION

Technical Problem

The present invention has been made in view of the circumstances as described above, and has as its object to provide an aqueous emulsion having high mechanical stability and capable of forming a coating with high water resistance. It is also an object of the present invention to provide an adhesive that contains the aqueous emulsion and that is free from splashing during high-speed application, has high initial bond strength, and exhibits high bond durability at high temperature and high humidity.

Solution to Problem

As a result of intensive studies, the present inventors have found that an aqueous emulsion and an adhesive containing the aqueous emulsion can serve as solutions to the above problems when the aqueous emulsion contains a specific amount of free PVA having a symmetry factor that falls within a specific range as determined by HPLC according to JIS K 0124 (2011). The present inventors have completed the present invention based on this finding.

That is, the present invention relates to the following aspects.

[1] An aqueous emulsion containing an ethylenically unsaturated monomer unit-containing polymer as a dispersoid and a polyvinyl alcohol as a dispersant, wherein an amount of the polyvinyl alcohol is present in the form of a free polyvinyl alcohol in the aqueous emulsion, the content of the free polyvinyl alcohol is 0.2 to 20 parts by mass relative to 100 parts by mass of the ethylenically unsaturated monomer unit-containing polymer, the free polyvinyl alcohol has a degree of saponification of 80.0 to 99.5 mol % and a viscosity-average degree of polymerization of 200 to 5000, and the free polyvinyl alcohol has a symmetry factor ($W_{0.05h}/2f$) that satisfies the following expression (1) as determined by gradient high-performance liquid chromatography for reversed-phase separation using a water-acetone eluent according to JIS K 0124 (2011):

$$0.85 \leq W_{0.05h}/2f \leq 1.30 \quad (1),$$

where $W_{0.05h}$ represents a peak width at 5% peak height and f represents a distance from a leading edge point a at 5% peak height to an intersection point b between a horizontal line passing through the leading edge point a and a vertical line passing through a peak top.

[2] The aqueous emulsion according to [1], produced by emulsion polymerizing an ethylenically unsaturated monomer using a polyvinyl alcohol in an amount of 0.5 to 40 parts by mass relative to 100 parts by mass of the ethylenically unsaturated monomer, wherein the polyvinyl alcohol has a symmetry factor ($W_{0.05h}/2f$) that satisfies the following expression (2) as determined by gradient high-performance liquid chromatography for reversed-phase separation using a water-acetone eluent according to JIS K 0124 (2011):

$$0.70 \leq W_{0.05h}/2f \leq 1.10 \quad (2),$$

where $W_{0.05h}$ represents a peak width at 5% peak height and f represents a distance from a leading edge point a at 5% peak height to an intersection point b between a horizontal line passing through the leading edge point a and a vertical line passing through a peak top.

[3] The aqueous emulsion according to [1] or [2], wherein the ethylenically unsaturated monomer unit-containing polymer is a polymer containing a unit derived from at least one selected from the group consisting of a vinyl ester monomer, a (meth)acrylic acid ester monomer, a styrene monomer, and a diene monomer, and the content of the unit is 70 mass % or more of the total monomer units of the polymer.

[4] The aqueous emulsion according to any one of [1] to [3], further containing a polyfunctional isocyanate compound.

[5] An adhesive containing the aqueous emulsion according to [4].

[6] A method for producing the aqueous emulsion according to [1], including emulsion polymerizing an ethylenically unsaturated monomer using a polyvinyl alcohol as a dispersant, wherein the polyvinyl alcohol is used in an amount of 0.5 to 40 parts by mass relative to 100 parts by mass of the ethylenically unsaturated monomer, and the polyvinyl alcohol has a symmetry factor ($W_{0.05h}/2f$) that satisfies the following expression (2) as determined by gradient high-performance liquid chromatography for reversed-phase separation using a water-acetone eluent according to JIS K 0124 (2011):

$$0.70 \leq W_{0.05h}/2f \leq 1.10 \quad (2),$$

where $W_{0.05h}$ represents a peak width at 5% peak height and f represents a distance from a leading edge point a at 5% peak height to an intersection point b between a horizontal line passing through the leading edge point a and a vertical line passing through a peak top.

Advantageous Effects of Invention

The aqueous emulsion of the present invention has high mechanical stability and is capable of forming a coating with high water resistance. An adhesive containing the aqueous emulsion is free from splashing during high-speed application, has high initial bond strength, and exhibits high bond durability at high temperature and high humidity.

BRIEF DESCRIPTION OF DRAWING

FIG. 1 shows an exemplary chromatogram obtained by high-performance liquid chromatography (HPLC) analysis associated with an embodiment of the present invention.

DESCRIPTION OF EMBODIMENTS

<Aqueous Emulsion>

The emulsion of the present invention is an aqueous emulsion containing an ethylenically unsaturated monomer unit-containing polymer as a dispersoid and a polyvinyl alcohol as a dispersant. The aqueous emulsion is characterized in that: an amount of the polyvinyl alcohol is present in the form of a free polyvinyl alcohol in the aqueous emulsion; the content of the free polyvinyl alcohol is 0.2 to 20 parts by mass relative to 100 parts by mass of the ethylenically unsaturated monomer unit-containing polymer; the free polyvinyl alcohol has a degree of saponification of 80.0 to 99.5 mol % and a viscosity-average degree of polymerization of 200 to 5000; and the free polyvinyl alcohol has a symmetry factor ($W_{0.05h}/2f$) that satisfies the following expression (1) as determined by gradient high-performance liquid chromatography for reversed-phase separation using a water-acetone eluent according to JIS K 0124 (2011).

$$0.85 \leq W_{0.05h}/2f \leq 1.30 \quad (1)$$

(In the expression, $W_{0.05h}$ represents a peak width at 5% peak height and f represents a distance from a leading edge point a at 5% peak height to an intersection point b between a horizontal line passing through the leading edge point a and a vertical line passing through a peak top.)

The aqueous emulsion of the present invention contains an ethylenically unsaturated monomer unit-containing polymer as a dispersoid.

Examples of the ethylenically unsaturated monomer used as a material for forming the ethylenically unsaturated monomer unit-containing polymer include:

olefin monomers such as ethylene, propylene, and isobutylene;

halogenated olefin monomers such as vinyl chloride, vinyl fluoride, vinylidene chloride, and vinylidene fluoride;

vinyl ester monomers such as vinyl formate, vinyl acetate, vinyl propionate, and vinyl versatate;

(meth)acrylic acid;

(meth)acrylic acid ester monomers such as methyl (meth)acrylate, ethyl (meth)acrylate, butyl (meth)acrylate, 2-ethylhexyl (meth)acrylate, dodecyl (meth)acrylate, and 2-hydroxyethyl (meth)acrylate;

(meth)acrylamide monomers such as dimethylaminoethyl (meth)acrylate, quaternary derivatives thereof, (meth)acrylamide, N-methylol (meth)acrylamide, N,N-dimethyl (meth)acrylamide, (meth)acrylamido-2-methylpropanesulfonic acid, and sodium salts thereof;

styrene monomers such as styrene, α-methylstyrene, p-styrenesulfonic acid, and sodium or potassium salts thereof;

diene monomers such as butadiene, isoprene, and chloroprene; and

N-vinylpyrrolidone.

These are used alone or in combination with one another for polymerization. The term "(meth)acryl" as used herein collectively refers to "acryl" and "methacryl".

The ethylenically unsaturated monomer unit-containing polymer is preferably a polymer having a monomer unit derived from at least one selected from the group consisting of a vinyl ester monomer, a (meth)acrylic acid ester monomer, a styrene monomer, and a diene monomer. The content of the monomer unit is preferably 70 mass % or more, more preferably 80 mass % or more, even more preferably 90 mass % or more, particularly preferably 95 mass % or more, and most preferably 100 mass %. If the content of the specific unit is less than 70 mass %, the emulsion polymerization stability of the aqueous emulsion may be insufficient. Among the above-mentioned monomers, a vinyl ester monomer is particularly preferred, and vinyl acetate is most preferred. It is preferable that, in this polymer, the content of a vinyl ester monomer unit be 70 mass % or more of the total monomer units of the polymer. It is more preferable that the content of a monomer unit derived from vinyl acetate be 70 mass % or more of the total monomer units of the polymer, and it is even more preferable that the content of a monomer unit derived from vinyl acetate be 90 mass % or more of the total monomer units of the polymer.

The aqueous emulsion of the present invention is composed so that the content of PVA present in a free form (which may hereinafter be simply referred to as "free PVA") in the emulsion falls within the specific range mentioned above and that a symmetry factor of the free PVA satisfies the above expression (1). An aqueous emulsion thus composed can have high mechanical stability and form a coating with high water resistance, although the technical reason for this is not entirely clear. Furthermore, an adhesive containing such an aqueous emulsion can be free from splashing during high-speed application, have high initial bond strength, and exhibit high bond durability at high temperature and high humidity.

The method for preparing the aqueous emulsion of the present invention is not particularly limited, and an example of the method is one in which, as described below, the ethylenically unsaturated monomer as described above is emulsion polymerized using a properly selected polymerization initiator in the presence of 0.5 to 40 parts by mass of the specific PVA (dispersant) described below relative to 100 parts by mass of the monomer. Such emulsion polymerization results in an aqueous emulsion in which an amount of the PVA used as an emulsion polymerization dispersant attaches to the surface of the ethylenically unsaturated monomer unit-containing polymer present as a dispersoid. An amount of the PVA used as a dispersant in emulsion polymerization functions as a dispersant as already described, while the rest of the PVA that does not attach to the dispersoid is present in the form of free PVA in the aqueous emulsion. Such PVA (free PVA) which is present in a free form in the aqueous emulsion is believed to have a greater influence on the physical properties of the aqueous emulsion and an adhesive obtained from the aqueous emulsion than the PVA attaching to the dispersoid.

One method for separating the PVA present in a free form in the aqueous emulsion of the present invention is as follows: the aqueous emulsion is diluted with water, the diluted aqueous emulsion is centrifuged, the resulting supernatant aqueous solution is collected, and the collected aqueous solution is dried. The separation of the free PVA can thus be accomplished.

The content of the free PVA in the aqueous emulsion of the present invention is 0.2 to 20 parts by mass relative to 100 parts by mass of the ethylenically unsaturated monomer unit-containing polymer. If the content of the free PVA is less than 0.2 parts by mass, an adhesive obtained from the aqueous emulsion is likely to splash during high-speed application. The content of the free PVA is preferably 1.0 part by mass or more and more preferably 2.0 parts by mass or more relative to 100 parts by mass of the ethylenically unsaturated monomer unit-containing polymer. If the content of the free PVA is more than 20 parts by mass, the aqueous emulsion may have insufficient mechanical stability, or an adhesive obtained from the aqueous emulsion may fail to exhibit sufficient bond durability at high temperature and high humidity. The content of the free PVA is preferably 15 parts by mass or less and more preferably 10 parts by mass relative to 100 parts by mass of the ethylenically unsaturated monomer unit-containing polymer.

The degree of saponification of the free PVA is measured according to JIS K 6726 (1994). The degree of saponification of the free PVA is 80.0 to 99.5 mol %. If the degree of saponification is less than 80.0 mol %, a coating formed from the aqueous emulsion has insufficient water resistance. The degree of saponification is preferably 82.0 mol % or more and more preferably 85.0 mol % or more. If the degree of saponification is more than 99.5 mol %, the PVA may not be produced reliably. The degree of saponification is preferably 99.0 mol % or less and more preferably 98.5 mol % or less.

The viscosity-average degree of polymerization of the free PVA is measured according to JIS K 6726 (1994). The viscosity-average degree of polymerization (P) may herein be simply referred to as "degree of polymerization". The free PVA is re-saponified to a degree of saponification of 99.5 mol % or more, then purified, and then subjected to measurement of a limiting viscosity [η] (liter/g) at 30° C. in water, from which the degree of polymerization is determined by the following equation.

$$P=([\eta]\times 10000/8.29)^{(1/0.62)}$$

The viscosity-average degree of polymerization of the free PVA is 200 to 5000. If the viscosity-average degree of polymerization is less than 200, a coating formed from the resulting aqueous emulsion has insufficient water resistance. The viscosity-average degree of polymerization is preferably 250 or more, more preferably 300 or more, and even more preferably 400 or more. If the viscosity-average degree of polymerization is more than 5000, an aqueous solution containing the PVA dissolved therein has too high a viscosity, which makes the aqueous emulsion difficult to handle. The viscosity-average degree of polymerization is preferably 4000 or less, more preferably 3000 or less, and even more preferably 2000 or less.

The free PVA has a symmetry factor ($W_{0.05h}/2f$) that satisfies the following expression (1) as determined by gradient high-performance liquid chromatography for reversed-phase separation using a water-acetone eluent according to JIS K 0124 (2011).

$$0.85 \leq W_{0.05h}/2f \leq 1.30 \tag{1}$$

(In the expression, $W_{0.05h}$ represents a peak width at 5% peak height and f represents a distance from a leading edge point a at 5% peak height to an intersection point b between a horizontal line passing through the leading edge point a and a vertical line passing through a peak top.)

The column used in HPLC is an ODS silica column, and the gradient conditions for the water-acetone eluent are as specified in Examples below. If the symmetry factor of the free PVA is less than 0.85, the aqueous emulsion may have insufficient mechanical stability or an adhesive containing the aqueous emulsion may have insufficient initial bond strength. The symmetry factor is preferably 0.90 or more, more preferably 0.95 or more, and even more preferably 1.00 or more. If the symmetry factor is more than 1.30, a coating formed from the aqueous emulsion may have insufficient water resistance, or an adhesive containing the aqueous emulsion may be likely to splash or may fail to exhibit sufficient bond durability at high temperature and high humidity. The symmetry factor is preferably 1.28 or less, more preferably 1.25 or less, and even more preferably 1.20 or less. The symmetry factor as used herein is a parameter that indicates the degree of symmetry of a peak measured by high-performance liquid chromatography. FIG. 1 shows an exemplary result of the HPLC measurement. In FIG. 1, the symmetry factor ($W_{0.05h}/2f$) is calculated using the width ($W_{0.05h}$) of the measured peak at 5% peak height and the distance (f) from the leading edge point a at 5% peak height to the intersection point b between a horizontal line passing through the leading edge point a and a vertical line passing through the peak top. The term "5% peak height" as used herein refers to a height corresponding to 1/20 of the height from baseline of the peak measured by HPLC analysis under the conditions described below. The symbol "f" as used herein represents the distance between the points a and b shown in FIG. 1, i.e., the distance from the leading edge point a at 5% peak height of the peak measured by HPLC analysis under the conditions described below to the intersection point b between a horizontal line passing through the leading edge point a and a vertical line passing through the peak top. In other words, "f" represents the distance from the leading edge to the point where a vertical line drawn from the peak top bisects the peak width at 5% peak height. In FIG. 1, the dotted line parallel to the horizontal axis represents the baseline. $W_{0.05h}$ and f are expressed in the same units. The closer the value of the symmetry factor is to 1, the higher the peak symmetry is.

The specific conditions employed for HPLC analysis in the present invention are as follows.

Sample concentration: 0.5 mg/mL
Sample solvent: Water
Amount injected: 15 μL
Detector: Evaporative light scattering detector (PL-ELS 1000 manufactured by Polymer Laboratories Ltd.)
ODS silica column: "TSKgel ODS-80TM" (having an inner diameter of 4.6 mm and a length of 15 cm and packed with particles having a diameter of 5 μm) manufactured by Tosoh Corporation
Column temperature: 40° C.
Liquid flow rate: Total flow rate of 0.8 mL/min The HPLC analysis of the free PVA in the present invention is performed by the following procedure. Liquids with different polarities are used in the mobile phase. Water is used as a high-polarity mobile phase A, and acetone is used as a low-polarity mobile phase B. Before sample injection, the column of the HPLC system is filled with a mixed solvent of the mobile phase A and mobile phase B at a volume ratio of 9/1. A sample is injected in this state. Immediately after the sample injection, the proportion of the mobile phase B in the mobile phase mixture is increased at a constant rate of 3 vol %/min over 30 minutes. After 30 minutes following the sample injection (by this time, the mobile phase is completely dominated by the mobile phase B), the mobile phase B is allowed to flow for 5 minutes.

The PVA used as a dispersant in a process (preferably emulsion polymerization) for producing the aqueous emulsion of the present invention (this PVA may hereinafter be referred to as "dispersant PVA") preferably has a symmetry factor ($W_{0.05h}/2f$) which, as is the case with the free PVA, satisfies the following expression (2) as determined by gradient high-performance liquid chromatography for reversed-phase separation using a water-acetone eluent according to JIS K 0124 (2011).

$$0.70 \leq W_{0.05h}/2f \leq 1.10 \quad (2)$$

(In the expression, $W_{0.05h}$ represents a peak width at 5% peak height and f represents a distance from a leading edge point a at 5% peak height to an intersection point b between a horizontal line passing through the leading edge point a and a vertical line passing through a peak top.)

If the symmetry factor of the PVA is less than 0.70, the resulting aqueous emulsion has insufficient fluidity. The symmetry factor is preferably 0.75 or more, more preferably 0.80 or more, and even more preferably 0.83 or more. If the symmetry factor is more than 1.10, a coating formed from the resulting aqueous emulsion has insufficient water resistance. The symmetry factor is preferably 1.05 or less, more preferably 1.00 or less, and even more preferably 0.99 or less.

Such a PVA can be obtained, for example, by saponification reaction of a vinyl ester resin with the aid of an alkali under certain conditions. The resulting PVA has in the molecule low-polarity moieties derived from the vinyl ester monomer and high-polarity moieties derived from vinyl alcohol units resulting from saponification. Thus, the low-polarity moieties and high-polarity moieties are distributed in the PVA molecule, and the degree of distribution significantly influences the physical properties such as surface activity of an aqueous solution of the PVA. The symmetry factor obtained by HPLC analysis serves as a measure for determining how the low-polarity moieties and high-polarity moieties are distributed in the PVA molecule. The distribution of the low-polarity moieties and high-polarity moieties in the PVA can be controlled to some extent by adjusting the conditions of saponification.

Examples of the method capable of controlling the distribution of the low-polarity moieties (moieties derived from the vinyl ester monomer) and the high-polarity moieties (vinyl alcohol units) in the PVA to adjust the symmetry factor include: 1) a method including a saponification step of mixing a saponification starting solution composed of a polyvinyl ester and an organic solvent with a solution containing a saponification catalyst (which will hereinafter be referred to as "saponification catalyst solution") and allowing the resulting mixture to gel, the method further including controlling the time to completion of the gelation; 2) a method including a saponification step of saponifying vinyl ester moieties more randomly; and 3) a method including allowing an exchange reaction to take place between the low-polarity moieties and high-polarity moieties of the PVA so as to increase the randomness of the distribution of these moieties. An example of the method 1) is one in which the saponification step employs a static mixer (preferably having 5 to 40 elements) to mix the saponification starting solution and the saponification catalyst solution and in which the shear rate is optimized to achieve the desired mixed state and fluidity (the shear rate is preferably adjusted to 5 to 90 $s^{-1}$). An example of the method 2) is one in which the saponification step includes adding a predetermined amount of water to the saponification starting solution composed of a polyvinyl ester and an organic solvent and to the saponification catalyst solution so as to cause saponification directly. An example of the method 3) is one in which the PVA in the form of a powder is heat-treated at a temperature of around 100 to 180° C. for a predetermined time.

The degree of saponification of the dispersant PVA is measured according to JIS K 6726 (1994). The degree of saponification of the PVA is preferably 80.0 to 99.5 mol %. If the degree of saponification is less than 80.0 mol %, the PVA has insufficient emulsion polymerization stability. The degree of saponification is more preferably 82.0 mol % or more and even more preferably 85.0 mol % or more. If the degree of saponification is more than 99.5 mol %, the PVA may not be produced reliably. The degree of saponification is more preferably 99.0 mol % or less and even more preferably 98.5 mol % or less.

The degree of polymerization of the dispersant PVA is measured according to JIS K 6726 (1994). That is, the PVA is re-saponified to a degree of saponification of 99.5 mol % or more, then purified, and then subjected to measurement of a limiting viscosity [η] (liter/g) at 30° C. in water, from which the degree of polymerization is determined by the following equation.

$$P=([\eta]\times 10000/8.29)^{(1/0.62)}$$

The degree of polymerization of the dispersant PVA is preferably 200 to 5000. If the degree of polymerization is less than 200, a coating formed from the resulting aqueous emulsion has insufficient water resistance. The degree of polymerization is more preferably 250 or more and even more preferably 300 or more. If the degree of polymerization is more than 5000, an aqueous solution containing the PVA dissolved therein has too high a viscosity, which makes the aqueous emulsion difficult to handle. The degree of polymerization is more preferably 4500 or less and even more preferably 4000 or less.

The solids concentration of the aqueous emulsion of the present invention which is obtained by any of the methods mentioned above is not particularly limited, and is typically 30 to 60 mass %.

The aqueous emulsion of the present invention which is obtained by any of the methods mentioned above can be used per se. The aqueous emulsion may optionally be used in combination with a known emulsion or a commonly used additive to form an emulsion composition, provided that the effect of the present invention is not impaired. Examples of the additive include an organic solvent (e.g., an aromatic compound such as toluene or xylene, an alcohol, a ketone, an ester, or a halogenated solvent), a cross-linker, a surfactant, a plasticizer, a suspension stabilizer, a thickener, a fluidity improver, a preservative, a defoamer, a filler, a wetting agent, a colorant, a binder, and a water retention agent. These may be used alone or in combination with one another.

Examples of the cross-linker include polyfunctional isocyanate compounds. Polyfunctional isocyanate compounds have two or more isocyanate groups in the molecule. Exemplary polyfunctional isocyanate compounds include tolylene diisocyanate (TDI), hydrogenated TDI, trimethylolpropane-TDI adduct (e.g., "Desmodur L" available from Bayer AG), triphenylmethane triisocyanate, methylene diphenyl diisocyanate (MDI), polymethylene polyphenyl polyisocyanate (PMDI), hydrogenated MDI, polymerized MDI, hexamethylene diisocyanate, xylylene diisocyanate, 4,4-dicyclohexylmethane diisocyanate, and isophorone diisocyanate. The polyfunctional isocyanate compound used may be a prepolymer resulting from polymerization of polyol with excess polyisocyanate and having a terminal group containing an isocyanate group. The above polyfunctional isocyanate compounds may be used alone or in combination with one another.

Examples of the plasticizer include a dicarboxylic acid ester compound and an aryloxy-containing compound.

Examples of the dicarboxylic acid ester compound include 2,2,4-trimethyl-1,3-pentanediol diisobutyrate, methyl adipate, dimethyl succinate, dimethyl glutarate, dibutyl phthalate, diphenyl phthalate, dihexyl phthalate, dicyclohexyl phthalate, dihydroabietyl phthalate, and dimethyl isophthalate.

Examples of the aryloxy group of the aryloxy-containing compound include a phenoxy group and a substituted phenoxy group, and examples of the substituted phenoxy group include $C_1$ to $C_{12}$ alkoxyphenoxy groups and $C_1$ to $C_{12}$ alkylphenoxy groups. The number of substituents is preferably, but not limited to, 1 to 5 and more preferably 1 to 3. A substituted or unsubstituted phenoxy-containing compound is preferred as the aryloxy-containing compound, and more preferred is a substituted or unsubstituted phenoxy-containing compound containing no vinyl group. Specific examples of the aryloxy-containing compound include ethylene glycol monophenyl ether, polypropylene glycol monophenyl ether, polyoxyethylene nonylphenyl ether, and polyoxyethylene di(nonyl)phenyl ether. The above plasticizers may be used alone or in combination with one another.

<Adhesive>

An adhesive containing the aqueous emulsion of the present invention is one embodiment of the present invention. A preferred method for producing the adhesive of the present invention is to incorporate a secondary component containing a polyfunctional isocyanate compound into a primary component composed of the aqueous emulsion of the present invention. The secondary component preferably contains a plasticizer as another additive in addition to the polyfunctional isocyanate compound serving as a cross-linker. As the polyfunctional isocyanate compound and plasticizer there can be used those mentioned above.

The content of the polyfunctional isocyanate compound may be adjusted according to different situations. The content of solids of the polyfunctional isocyanate compound is preferably 3 to 100 parts by mass and more preferably 5 to 50 parts by mass relative to 100 parts by mass of solids of the primary component. When the content of the polyfunctional isocyanate compound is within the above range, an aqueous emulsion having high bond strength can be inexpensively produced. An available method for calculating the solids content is the method employed for measuring the solids concentration of aqueous emulsions in mechanical stability evaluation in Examples described below. The aqueous emulsion of the present invention can be used in a wide variety of other applications such as paints, fiber processing agents, paper processing agents, binders for inorganic substances, cement admixtures, and mortar primers. Furthermore, the aqueous emulsion may be spray-dried into a so-called powdery emulsion, which is also effectively used.

The content of the plasticizer may be adjusted according to different situations. The content of solids of the plasticizer is preferably 0.5 to 20 parts by mass and more preferably 1.0 to 10 parts by mass relative to 100 parts by mass of solids of the primary component. It is preferable that the content of the plasticizer not only be within such a range but also be lower than the content of the polyfunctional isocyanate compound. When the content of the plasticizer is within the above range, an adhesive having high bond strength can be obtained. An available method for calculating the solids content is the method employed for measuring the solids concentration of aqueous emulsions in mechanical stability evaluation in Examples described below.

<Method for Producing Aqueous Emulsion>

As previously described, an example of the method for producing an aqueous emulsion meeting the requirements specified in the present invention is one in which: 1) an ethylenically unsaturated monomer is emulsion polymerized using a properly selected polymerization initiator in the presence of 0.5 to 40 parts by mass of the dispersant PVA satisfying the expression (2) relative to 100 parts by mass of the monomer. Examples of the method for controlling the emulsion polymerization include: 2) adjusting the amount of the PVA added relative to the ethylenically unsaturated monomer; and 3) adjusting the amount of ion-exchanged water used. A combination of these methods may be used as the method for producing the aqueous emulsion of the present invention.

The method for producing the aqueous emulsion according to the present invention is not particularly limited, and an example of the method is emulsion polymerization of 100 parts by mass of the ethylenically unsaturated monomer in the presence of 0.5 to 40 parts by mass of the dispersant PVA. When the emulsion polymerization dispersant is introduced into the polymerization system in this method, how to introduce and add the dispersant is not particularly limited. Examples of the method for introducing and adding the dispersant include: adding the emulsion polymerization dispersant to the polymerization system all at once at the beginning of the polymerization; and adding the dispersant continuously during the polymerization. Adding the emulsion polymerization dispersant to the polymerization system all at once at the beginning of the polymerization is more preferred in terms of increasing the degree of grafting of the PVA on the emulsion dispersoid.

The amount of the emulsion polymerization dispersant PVA used in the emulsion polymerization is preferably 0.5 to 40 parts by mass, more preferably 0.6 to 20 parts by mass, even more preferably 0.7 to 15 parts by mass, and particularly preferably 0.9 to 9 parts by mass, relative to 100 parts by mass of the ethylenically unsaturated monomer.

As the polymerization initiator in the emulsion polymerization employing the emulsion polymerization dispersant PVA, there can be used common emulsion polymerization initiators such as water-soluble single initiators (those usable as one-component initiators) and water-soluble redox initiators. Such initiators may be used alone or in combination with one another. Redox initiators are more preferred.

Examples of the water-soluble single initiators include an azo initiator and a peroxide such as hydrogen peroxide or a persulfuric acid salt (potassium persulfate, sodium persulfate, or ammonium persulfate). Examples of the azo initiator include 2,2'-azobis(isobutyronitrile), 2,2'-azobis(2,4-dimethylvaleronitrile), and 2,2'-azobis(4-methoxy-2,4-dimethylvaleronitrile).

The redox initiator to be used can be an initiator consisting of a combination of an oxidant and a reductant. A peroxide is preferred as the oxidant. Examples of the reductant include metal ions and reducing compounds. Examples of the combination of an oxidant and a reductant include: a combination of a peroxide and a metal ion; a combination of a peroxide and a reducing compound; and a combination of a peroxide, a metal ion, and a reducing compound. Examples of the peroxide include: hydrogen peroxide; hydroperoxides such as cumene hydroperoxide and t-butyl hydroperoxide; persulfuric acid salts (potassium persulfate, sodium persulfate, and ammonium persulfate); t-butyl peroxyacetate; and peresters (t-butyl peroxybenzoate). Examples of the metal ion include metal ions such as $Fe^{2+}$, $Cr^{2+}$, $V^{2+}$, $Co^{2+}$, $Ti^{3+}$, and $Cu^+$ that are capable of accepting one electron transferred.

Examples of the reducing compound include sodium hydrogen sulfite, sodium hydrogen carbonate, tartaric acid, fructose, dextrose, sorbose, inositol, rongalite, and ascorbic acid. Preferred among these is a combination of at least one oxidant selected from the group consisting of hydrogen peroxide, potassium persulfate, sodium persulfate, and ammonium persulfate and at least one reductant selected from the group consisting of sodium hydrogen sulfite, sodium hydrogen carbonate, tartaric acid, rongalite, and ascorbic acid, and more preferred is a combination of hydrogen peroxide and at least one reductant selected from the group consisting of sodium hydrogen sulfite, sodium hydrogen carbonate, tartaric acid, rongalite, and ascorbic acid.

The dispersion medium used in the emulsion polymerization is preferably an aqueous medium based on water. The aqueous medium based on water may contain a water-soluble organic solvent (such as an alcohol or ketone) freely soluble in water. The term "aqueous medium based on water" as used herein refers to a dispersion medium containing 50 mass % or more of water. In terms of cost and environmental burden, the dispersion medium is preferably an aqueous medium containing 90 mass % or more of water and is more preferably water. The method for producing the aqueous emulsion preferably includes, before the start of emulsion polymerization, heating the dispersant PVA to dissolve the PVA in the dispersion medium, cooling the resulting solution, and purging the solution with nitrogen. The heating temperature is preferably 90° C. or higher. The temperature during the emulsion polymerization is preferably, but not limited to, around 20 to 85° C. and more preferably around 40 to 80° C.

The present invention encompasses embodiments obtainable by combining the above features in various manners within the technical scope of the present invention as long as the effect of the present invention can be obtained.

EXAMPLES

Next, the present invention will be described more specifically by way of Examples. The present invention is by no means limited by the following Examples and can be modified in various ways by those ordinarily skilled in the art within the technical scope of the invention. It should be noted that in the following Examples and Comparative Examples, "part(s)" and "%" refer to "part(s) by mass" and "mass %", respectively, unless otherwise specified.

Free PVAs in aqueous emulsions obtained in Examples and Comparative Examples were separated from the emulsions by the method described below, and the physical properties of the free PVAs were measured by the methods described below. PVA-1, PVA-2, PVA-3, and PVA-4, which were used in production of the aqueous emulsions and will be described later, were also examined for their physical properties by the methods described below.

[Method for Separating Free PVA from Aqueous Emulsion]

Each of the aqueous emulsions obtained in Examples and Comparative Examples was diluted with water to a solids concentration of 10 mass % and then centrifuged using a centrifugal separator (SCR-20B, manufactured by Hitachi Koki Co., Ltd.) at 20,000 rpm for 30 minutes. The resulting supernatant aqueous solution was collected, and water is fully evaporated from the collected aqueous solution to give a free PVA in the form of solids.

[Viscosity-Average Degree of Polymerization of PVA]

The viscosity-average degree of polymerization of each PVA was determined by a method as specified in JIS K 6726 (1994).

[Degree of Saponification of PVA]

The degree of saponification of each PVA was determined by a method as specified in JIS K 6726 (1994).

[Conditions of HPLC Measurement of PVA]

Each PVA was adjusted to a concentration of 0.5 mg/mL using water as a solvent to prepare a measurement sample. "LC-10ADvp" manufactured by Shimadzu Corporation was used as a HPLC system, "TSKgel ODS-80TM" (having an inner diameter of 4.6 mm and a length of 15 cm and packed with particles having a diameter of 5 μm) manufactured by Tosoh Corporation was used as a HPLC column, and "PL-ELS1000" manufactured by Polymer Laboratories Ltd. was used as an evaporative light scattering detector. The procedure for the analysis will now be described. Water was used as a mobile phase A and acetone was used as a mobile phase B. At the beginning of the analysis, the HPLC system was filled with a mixed solvent of the mobile phase A and mobile phase B at a volume ratio of 9/1. In this state, the sample was injected in an amount of 15 μL. Immediately after the sample injection, the proportion of the mobile phase B in the mobile phase mixture was increased at a constant rate of 3 vol %/min over 30 minutes. After 30 minutes following the sample injection (by this time, the mobile phase was completely dominated by the mobile phase B), the mobile phase B was allowed to flow for 5 minutes. The column temperature was 40° C., and the liquid flow rate was 0.8 mL/min in total. The determination of the baseline was accomplished by analyzing a blank test solution which was prepared in the same manner as the analysis sample except for dissolving the PVA.

[Calculation of Symmetry Factor]

The symmetry factor ($W_{0.05h}/2f$) was determined by gradient high-performance liquid chromatography for reversed-phase separation using a water-acetone eluent according to JIS K 0124 (2011). $W_{0.05h}$ represents a peak width at 5% peak height, and f represents a distance from a leading edge point a at 5% peak height to an intersection point b between a horizontal line passing through the leading edge point a and a vertical line passing through a peak top. That is, the symmetry factor ($W_{0.05h}/2f$) was calculated using a peak width ($W_{0.05h}$) at 5% height of the peak measured by the HPLC analysis under the above conditions (at a height corresponding to 1/20 of the height of the peak from the baseline) and a distance (f) from the leading edge point a at 5% height of the measured peak to the intersection point b between a horizontal line passing through the leading edge point a and a vertical line passing through the peak top. FIG. 1 shows an example of the HPLC analysis results.

The aqueous emulsions and adhesives obtained in Examples and Comparative Examples were evaluated by the methods described below.

[Mechanical Stability of Aqueous Emulsion]

Each of the polyvinyl acetate emulsions obtained in Examples and Comparative Examples was tested using a Maron-type mechanical stability tester (manufactured by Shinsei Sangyo Co., Ltd. under the trade name "MARON 1000 rpm") at 20° C. and 1000 rpm with a load of 0.5 kg/cm² for 10 minutes. The emulsion was then filtered through a 60-mesh stainless steel sieve (ASTM standard sieve), and the ratio (%) of the mass of the filtration residue to the mass of the solids of the emulsion was measured. The lower the ratio of the filtration residue mass is, the better the mechanical stability is. The ratio of the filtration residue mass determined for an aqueous emulsion is preferably 1.0% or less, more preferably 0.4% or less, even more preferably 0.2% or less, and particularly preferably 0.1% or less. The solids concentration and the filtration residue mass were measured as follows.

(1) Method for Measurement of Solids Concentration

An amount of 3 g of the aqueous emulsion was put in an aluminum dish, which was accurately weighed. The emulsion was then dried with a dryer at 105° C. for 24 hours to evaporate water. The mass of the resulting dry product was measured, and the solids concentration was calculated from the mass ratio.

(2) Method for Measurement of Filtration Residue Mass

The filtration residue was dried with a dryer at 105° C. for 24 hours to evaporate water, and the mass of the resulting dry product was determined as the filtration residue mass.

[Water Resistance of Coating Formed from Aqueous Emulsion]

Each of the polyvinyl acetate emulsions obtained in Examples and Comparative Examples was cast onto a PET film at a temperature of 20° C. and a humidity of 65% RH and dried for 1 week, after which the resulting dry product was separated from the PET film. A 450-μm-thick film was thus obtained. A portion of the film was sampled out and dried at 105° C. for 2 hours. The solids concentration (i) (mass %) of the film was determined from the change in mass before and after drying. Besides, a 10 cm×10 cm piece was cut out from the 450-μm-thick film and its mass (ii) was measured. The mass of solids (ii') in the film piece was determined by the equation (3) given below using the film solids concentration (i) (mass %). The film piece was immersed in 90° C. hot water for 30 minutes, after which the resulting solution was cooled to room temperature and centrifuged using a centrifugal separator (SCR-20B, manufactured by Hitachi Koki Co., Ltd.) at 20000 rpm for 30 minutes. The resulting solids were collected and dried at 105° C. for 2 hours, after which their mass (iii) was measured. The degree of dissolution was calculated by the equation (4) given below, and the water resistance of the coating was evaluated according to the criteria listed below.

Film mass correction before immersion: $(ii')=(ii)\times(i)/100$      Equation (3)

Degree of dissolution (%)=$[\{(ii')-(iii)\}/(ii')]\times 100$      Equation (4)

A: Less than 55%

B: 55% or more and less than 60%

C: 60% or more and less than 65%

D: 65% or more and less than 70%

E: 70% or more

[Initial Bond Strength of Adhesive]

Each of the adhesives obtained in Examples and Comparative Examples was used to bond sheets of kraft paper together; specifically, the adhesive was applied using an initial bond strength tester (JT-1) manufactured by Japan Tobacco Inc. at an application speed of 30 m/min and a temperature of 30° C. in an amount of 100 g/m² (Wet). A peel test was then conducted in which the assembly time was 2 seconds and the pressing time was 10 seconds. The initial bond strength of each adhesive was evaluated according to the following criteria.

A: Completely broken.

B: Partially broken.

C: Hardly broken.

[Splashing of Adhesive During High-Speed Application]

Each of the adhesives obtained in Examples and Comparative Examples was applied to paper for paper core using a roll coater at an application speed of 1000 m/min and a temperature of 30° C., and a paper core was fabricated. Splashing of the adhesive from the coater roll during this process was evaluated according to the following criteria.

A: No splashing.

B: Slight splashing.

C: Much splashing, resulting in application failure.

[Bond Durability of Adhesive at High Temperature and High Humidity]

A specimen was prepared using each of the adhesives obtained in Examples and Comparative Examples by employing the conditions listed below. The bond strength of the specimen in normal condition and the bond strength of the specimen repeatedly immersed in boiling water were measured, and the bond strengths were evaluated according to the criteria listed below.

Wood-bonding strength

[Bonding Conditions]

Adherend: Birch/Birch (straight grain) with a water content of 8%

Spread: 250 g/m² (double spread)

Application method: Manual application

Assembly time: 1 minute

Pressing conditions: At 20° C. for 24 hours with a pressure of 10 kg/cm²

[Measurement Conditions]

The compression shear bond strength was measured according to JIS K 6852 (1994).

(1) Strength in normal condition: The specimen was aged at 20° C. for 7 days, and the bond strength of the as-aged specimen was measured.

A: 180 kg/cm² or more
B: 120 kg/cm² or more and less than 180 kg/cm²
C: Less than 120 kg/cm²

(2) Repeated immersion in boiling water: The specimen was aged at 20° C. for 7 days, then immersed in boiling water for 4 hours, then dried in air at 60° C. for 20 hours, and further immersed in boiling water for 4 hours, after which the specimen was cooled in room-temperature water and the wet specimen was subjected to the test.

A: 80 kg/cm² or more
B: 50 kg/cm² or more and less than 80 kg/cm²
C: Less than 50 kg/cm²

(Production of PVA-1)

There were used: a polymerization vessel (continuous polymerization chamber) equipped with a reflux condenser, a material feed line, a thermometer, a nitrogen inlet, and a stirring blade; and an apparatus equipped with a reflux condenser, a material feed line, a reaction solution collection line, a thermometer, a nitrogen inlet, and a stirring blade. Vinyl acetate (700 L/H), methanol (122 L/H), and a 1% methanol solution (0.4 L/H) of 2,2'-azobis(4-methoxy-2,4-dimethylvaleronitrile) (AMV) were continuously fed to the continuous polymerization chamber using a metering pump. The polymerization solution was continuously collected from the polymerization chamber in such a manner that the liquid level in the polymerization chamber was kept constant. The rate of polymerization at the outlet of the polymerization chamber was controlled to 25.0%. The residence time in the polymerization chamber was 5 hours. The temperature at the outlet of the polymerization chamber was 63° C. Methanol vapor was introduced into the polymerization solution collected from the polymerization chamber to remove the vinyl acetate monomer remaining unreacted. A methanol solution of a vinyl acetate polymer (concentration: 30 mass %) was thus obtained.

The methanol solution of polyvinyl acetate (PVAc) (concentration: 30 mass %) obtained in the above polymerization process was fed as a saponification starting solution at a rate of 4200 L/h, while a methanol solution of sodium hydroxide (concentration: 4 mass %) serving as a saponification catalyst solution was fed at a rate of 147 L/h. The saponification starting solution and the saponification catalyst solution thus fed were mixed using a static mixer with 22 elements at a shear rate of 10.6 s⁻¹. A pressure drop per element was 0.04 MPa. The mixture thus obtained was placed on a belt and left under a temperature of 40° C. for 18 minutes to allow a saponification reaction to proceed. The reaction product was then ground and dried to obtain a polyvinyl alcohol (PVA-1). PVA-1 thus obtained had a viscosity-average degree of polymerization of 2400, a degree of saponification of 88.0 mol %, and a symmetry factor as expressed in the expression (2) of 0.88.

(Production of PVA-2)

There were used: a continuous polymerization chamber equipped with a reflux condenser, a material feed line, a thermometer, a nitrogen inlet, and a stirring blade; and an apparatus equipped with a reflux condenser, a material feed line, a reaction solution collection line, a thermometer, a nitrogen inlet, and a stirring blade. Vinyl acetate (437 L/H), methanol (97 L/H), and a 1% methanol solution of AMV (1.1 L/H) were continuously fed to the continuous polymerization chamber using a metering pump. The polymerization solution was continuously collected from the polymerization chamber in such a manner that the liquid level in the polymerization chamber was kept constant. The rate of polymerization at the outlet of the polymerization chamber was controlled to 40.0%. The residence time in the polymerization chamber was 5 hours. The temperature at the outlet of the polymerization chamber was 63° C. Methanol vapor was introduced into the polymerization solution collected from the polymerization chamber to remove the vinyl acetate monomer remaining unreacted. A methanol solution of a vinyl acetate polymer (concentration: 32 mass %) was thus obtained.

The methanol solution of polyvinyl acetate (PVAc) (concentration: 32 mass %) obtained in the above polymerization process was fed as a saponification starting solution at a rate of 4600 L/h, while a methanol solution of sodium hydroxide (concentration: 4 mass %) serving as a saponification catalyst solution was fed at a rate of 205 L/h. The saponification starting solution and the saponification catalyst solution thus fed were mixed using a static mixer with 36 elements at a shear rate of 70 s⁻¹. A pressure drop per element was 0.04 MPa. The mixture thus obtained was placed on a belt and left under a temperature of 40° C. for 18 minutes to allow a saponification reaction to proceed. The reaction product was then ground and dried to obtain a polyvinyl alcohol (PVA-2). PVA-2 thus obtained had a viscosity-average degree of polymerization of 1700, a degree of saponification of 98.5 mol %, and a symmetry factor as expressed in the expression (2) of 0.77.

(Production of PVA-3)

There were used: a continuous polymerization chamber equipped with a reflux condenser, a material feed line, a thermometer, a nitrogen inlet, and a stirring blade; and an apparatus equipped with a reflux condenser, a material feed line, a reaction solution collection line, a thermometer, a nitrogen inlet, and a stirring blade. Vinyl acetate (437 L/H), methanol (97 L/H), and a 1% methanol solution of AMV (1.1 L/H) were continuously fed to the continuous polymerization chamber using a metering pump. The polymerization solution was continuously collected from the polymerization chamber in such a manner that the liquid level in the polymerization chamber was kept constant. The rate of polymerization at the outlet of the polymerization chamber was controlled to 40.0%. The residence time in the polymerization chamber was 5 hours. The temperature at the outlet of the polymerization chamber was 63° C. Methanol vapor was introduced into the polymerization solution collected from the polymerization chamber to remove the vinyl acetate monomer remaining unreacted. A methanol solution of a vinyl acetate polymer (concentration: 32 mass %) was thus obtained.

The methanol solution of polyvinyl acetate (PVAc) (concentration: 32 mass %) obtained in the above polymerization process was fed as a saponification starting solution at a rate of 4200 L/h, while a methanol solution of sodium hydroxide (concentration: 4 mass %) serving as a saponification catalyst solution was fed at a rate of 313 L/h. The saponification starting solution and the saponification catalyst solution thus fed were mixed using a static mixer with 45 elements at a shear rate of 100 s$^{-1}$. A pressure drop per element was 0.04 MPa. The mixture thus obtained was placed on a belt and left under a temperature of 40° C. for 18 minutes to allow a saponification reaction to proceed. The reaction product was then ground and dried to obtain a polyvinyl alcohol (PVA-3). PVA-3 thus obtained had a viscosity-average degree of polymerization of 1700, a degree of saponification of 99.95 mol %, and a symmetry factor as expressed in the expression (2) of 0.65.

(Production of PVA-4)

There were used: a continuous polymerization chamber equipped with a reflux condenser, a material feed line, a thermometer, a nitrogen inlet, and a stirring blade; and an apparatus equipped with a reflux condenser, a material feed line, a reaction solution collection line, a thermometer, a nitrogen inlet, and a stirring blade. Vinyl acetate (500 L/H), methanol (103 L/H), and a 1% methanol solution of AMV (0.8 L/H) were continuously fed to the continuous polymerization chamber using a metering pump. The polymerization solution was continuously collected from the polymerization chamber in such a manner that the liquid level in the polymerization chamber was kept constant. The rate of polymerization at the outlet of the polymerization chamber was controlled to 35.0%. The residence time in the polymerization chamber was 5 hours. The temperature at the outlet of the polymerization chamber was 63° C. Methanol vapor was introduced into the polymerization solution collected from the polymerization chamber to remove the vinyl acetate monomer remaining unreacted. A methanol solution of a vinyl acetate polymer (concentration: 30 mass %) was thus obtained.

The methanol solution of polyvinyl acetate (PVAc) (concentration: 30 mass %) obtained in the above polymerization process was fed as a saponification starting solution at a rate of 3500 L/h, while a methanol solution of sodium hydroxide (concentration: 4 mass %) serving as a saponification catalyst solution was fed at a rate of 98 L/h. The saponification starting solution and the saponification catalyst solution thus fed were mixed using a static mixer with 4 elements at a shear rate of 4 s$^{-1}$. A pressure drop per element was 0.04 MPa. The mixture thus obtained was placed on a belt and left under a temperature of 40° C. for 18 minutes to allow a saponification reaction to proceed. The reaction product was then ground and dried to obtain a polyvinyl alcohol (PVA-4). PVA-4 thus obtained had a viscosity-average degree of polymerization of 2000, a degree of saponification of 80.0 mol %, and a symmetry factor as expressed in the expression (2) of 1.28.

Example 1

(Production of Aqueous Emulsion)

An amount of 258.1 g of ion-exchanged water and 18.9 g of PVA-1 were placed in a 1 L glass polymerization vessel equipped with a reflux condenser, a dropping funnel, a thermometer, and a nitrogen inlet. PVA-1 was fully dissolved at 95° C. to give an aqueous PVA solution. This aqueous PVA solution was then cooled and purged with nitrogen, and 25.2 g of vinyl acetate was added to the solution under stirring at 200 rpm, followed by a temperature increase to 60° C. After that, a redox initiator consisting of 6.9 g of 5% hydrogen peroxide and 3.0 g of 20% tartaric acid were added to initiate emulsion polymerization. After 15 minutes following the initiation of polymerization, vinyl acetate was continuously added in a total amount of 226.4 g over 3 hours, following which 0.9 g of 5% hydrogen peroxide and 0.3 g of 20% tartaric acid were added to bring the polymerization to completion, giving a polyvinyl acetate emulsion having a solids concentration of 49.5 mass %. In this emulsion, the content of vinyl ester (specific unit) was 100 mass % relative to the total monomer units of the polymer present as a dispersoid. The results of evaluation of the physical properties of the obtained emulsion are shown in Table 2.

(Production of Adhesive)

To 100 parts by mass (solids) of the aqueous emulsion were added 5 parts by mass of ethylene glycol monophenyl ether and 25 parts by mass of polymethylene polyphenyl polyisocyanate (manufactured by Nippon Polyurethane Industry Co., Ltd. under the trade name "Millionate MR-100"), and thus an adhesive was prepared. The results of evaluation of the obtained adhesive are shown in Table 2.

Examples 2 to 5 and Comparative Examples 1 to 4

Various aqueous emulsions were produced in the same manner as in Example 1, except that emulsion polymerization was carried out by varying the amounts of the initially-introduced vinyl acetate, PVA, ion-exchanged water, and subsequently-added vinyl acetate and the types of the PVA and initiator as shown in Table 1. The results of evaluation of the obtained aqueous emulsions are shown in Table 2.

Adhesives of Examples 2 to 5 and Comparative Examples 2 to 4 were prepared in the same manner as in Example 1, except for substituting the aqueous emulsion of Example 1 with the various aqueous emulsions produced using the conditions shown in Table 1. The results of evaluation of the physical properties of the obtained adhesives are shown in Table 2.

TABLE 1

| | Initially-introduced materials | | | | | | |
|---|---|---|---|---|---|---|---|
| | | PVA | | | | | |
| | Vinyl acetate (g) | Type | Value of expression (2) | (g) | Ion-exchanged water (g) | Subsequently-added vinyl acetate (g) | Redox initiator |
| Example 1 | 25.2 | PVA-1 | 0.88 | 18.9 | 258.1 | 226.4 | Hydrogen peroxide/Tartaric acid |
| Example 2 | 25.2 | PVA-2 | 0.77 | 18.9 | 258.1 | 226.4 | Hydrogen peroxide/Tartaric acid |
| Example 3 | 12.6 | PVA-1 | 0.88 | 25.1 | 344.2 | 113.2 | Hydrogen peroxide/Tartaric acid |
| Example 4 | 25.2 | PVA-1 | 0.88 | 15.5 | 180.4 | 226.4 | Hydrogen peroxide/Tartaric acid |
| Example 5 | 25.2 | PVA-1 | 0.88 | 18.9 | 258.1 | 226.4 | Potassium persulfate/Tartaric acid |

TABLE 1-continued

| | Initially-introduced materials | | | | | | |
|---|---|---|---|---|---|---|---|
| | Vinyl acetate (g) | PVA Type | Value of expression (2) | (g) | Ion-exchanged water (g) | Subsequently-added vinyl acetate (g) | Redox initiator |
| Comparative Example 1 | 25.2 | PVA-1 | 0.88 | 0.5 | 250.2 | 226.4 | Hydrogen peroxide/Tartaric acid |
| Comparative Example 2 | 8.4 | PVA-1 | 0.88 | 36.6 | 400 | 75.5 | Hydrogen peroxide/Tartaric acid |
| Comparative Example 3 | 25.2 | PVA-3 | 0.65 | 18.9 | 258.1 | 226.4 | Hydrogen peroxide/Tartaric acid |
| Comparative Example 4 | 25.2 | PVA-4 | 1.28 | 18.9 | 258.1 | 226.4 | Hydrogen peroxide/Tartaric acid |

TABLE 2

| | Free PVA | | | | | Aqueous emulsion | | | Adhesive | |
|---|---|---|---|---|---|---|---|---|---|---|
| | Degree of polymerization | Degree of saponification (mol %) | Value of expression (1) | Content[1] (parts by mass) | Polymer[2] (Dispersoid) | Mechanical stability[3] (%) | Water resistance | Initial bond strength | Splashing | Bond durability Strength in normal condition | After repeated immersion in boiling water |
| Example 1 | 1300 | 88.0 | 1.18 | 3.58 | PVAc | 0.1 | A | A | A | A | A |
| Example 2 | 1000 | 98.5 | 0.92 | 4.25 | PVAc | 0.1 | A | B | A | A | A |
| Example 3 | 1570 | 88.0 | 1.03 | 10.8 | PVAc | 0.4 | A | A | A | A | B |
| Example 4 | 1300 | 88.0 | 1.24 | 2.33 | PVAc | 0.1 | A | B | B | A | B |
| Example 5 | 1300 | 88.0 | 0.97 | 3.93 | PVAc | 0.1 | A | B | A | A | B |
| Comparative Example 1 | 1250 | 88.0 | 1.32 | 0.12 | PVAc | Stable aqueous emulsion was not obtained. | | | | | |
| Comparative Example 2 | 1600 | 88.0 | 0.91 | 24.3 | PVAc | 1.1 | B | B | A | B | C |
| Comparative Example 3 | 1100 | 99.95 | 0.83 | 4.87 | PVAc | 0.5 | A | C | A | B | B |
| Comparative Example 4 | 1300 | 80.0 | 1.39 | 3.32 | PVAc | 0.1 | E | A | C | B | C |

[1])Content of free PVA relative to 100 parts by mass of polymer (dispersoid)
[2])PVAc: Polyvinyl acetate
[3])Ratio (%) of filtration residue mass to mass of solids of aqueous emulsion Table 2 demonstrates that the aqueous emulsions of Examples 1 to 5 are superior in terms of the mechanical stability and the water resistance of coatings. It is also seen that adhesives containing such an aqueous emulsion are free from splashing during high-speed application, have high initial bond strength, and exhibit high bond durability at high temperature and high humidity.

INDUSTRIAL APPLICABILITY

The aqueous emulsion of the present invention is superior in terms of the mechanical stability and the water resistance of coatings. The adhesive of the present invention which contains the aqueous emulsion is free from splashing during high-speed application, has high initial bond strength, and exhibits high bond durability at high temperature and high humidity.

The invention claimed is:

1. An aqueous emulsion comprising an ethylenically unsaturated monomer unit-containing polymer as a dispersoid and a polyvinyl alcohol as a dispersant, wherein
an amount of the polyvinyl alcohol is present in the form of a free polyvinyl alcohol in the aqueous emulsion,
the content of the free polyvinyl alcohol is 0.2 to 20 parts by mass relative to 100 parts by mass of the ethylenically unsaturated monomer unit-containing polymer,
the free polyvinyl alcohol has a degree of saponification of 80.0 to 99.5 mol % and a viscosity-average degree of polymerization of 200 to 5000, and
the free polyvinyl alcohol has a symmetry factor ($W_{0.05h}/2f$) that satisfies the following expression (1) as determined by gradient high-performance liquid chromatography for reversed-phase separation using a water-acetone eluent according to JIS K 0124 (2011):

$$0.85 \leq W_{0.05h}/2f \leq 1.30 \qquad (1),$$

where $W_{0.05h}$ represents a peak width at 5% peak height and f represents a distance from a leading edge point a at 5% peak height to an intersection point b between a horizontal line passing through the leading edge point a and a vertical line passing through a peak top.

2. The aqueous emulsion according to claim 1, produced by emulsion polymerizing an ethylenically unsaturated monomer using a polyvinyl alcohol in an amount of 0.5 to 40 parts by mass relative to 100 parts by mass of the ethylenically unsaturated monomer, wherein the polyvinyl alcohol has a symmetry factor ($W_{0.05h}/2f$) that satisfies the following expression (2) as determined by gradient high-performance liquid chromatography for reversed-phase separation using a water-acetone eluent according to JIS K 0124 (2011):

$$0.70 \leq W_{0.05h}/2f \leq 1.10 \quad (2),$$

where $W_{0.05h}$ represents a peak width at 5% peak height and f represents a distance from a leading edge point a at 5% peak height to an intersection point b between a horizontal line passing through the leading edge point a and a vertical line passing through a peak top.

3. The aqueous emulsion according to claim 1, wherein the ethylenically unsaturated monomer unit-containing polymer is a polymer containing a unit derived from at least one selected from the group consisting of a vinyl ester monomer, a (meth)acrylic acid ester monomer, a styrene monomer, and a diene monomer, and the content of the unit is 70 mass % or more of the total monomer units of the polymer.

4. The aqueous emulsion according to claim 1, further comprising a polyfunctional isocyanate compound.

5. An adhesive comprising the aqueous emulsion according to claim 4.

6. A method for producing the aqueous emulsion according to claim 1, comprising emulsion polymerizing an ethylenically unsaturated monomer using a polyvinyl alcohol as a dispersant, wherein the polyvinyl alcohol is used in an amount of 0.5 to 40 parts by mass relative to 100 parts by mass of the ethylenically unsaturated monomer, and the polyvinyl alcohol has a symmetry factor ($W_{0.05h}/2f$) that satisfies the following expression (2) as determined by gradient high-performance liquid chromatography for reversed-phase separation using a water-acetone eluent according to JIS K 0124 (2011):

$$0.70 \leq W_{0.05h}/2f \leq 1.10 \quad (2),$$

where $W_{0.05h}$ represents a peak width at 5% peak height and f represents a distance from a leading edge point a at 5% peak height to an intersection point b between a horizontal line passing through the leading edge point a and a vertical line passing through a peak top.

* * * * *